(12) United States Patent
Przygodda

(10) Patent No.: US 8,189,249 B2
(45) Date of Patent: May 29, 2012

(54) HOLOGRAPHIC STORAGE SYSTEM USING DESTRUCTIVE INTERFERENCE FOR PIXEL DETECTION

(75) Inventor: Frank Przygodda, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 199 days.

(21) Appl. No.: 11/894,470

(22) Filed: Aug. 21, 2007

(65) Prior Publication Data

US 2008/0055605 A1 Mar. 6, 2008

(30) Foreign Application Priority Data

Sep. 1, 2006 (EP) .................................... 06119969

(51) Int. Cl.
*G03H 1/12* (2006.01)
*G03H 1/04* (2006.01)
(52) U.S. Cl. ............. 359/11; 359/35; 356/359; 369/103
(58) Field of Classification Search ............... 359/35, 359/11, 10; 369/103; 356/359
See application file for complete search history.

(56) References Cited

U.S. PATENT DOCUMENTS

| | | | | |
|---|---|---|---|---|
| 5,777,742 A | * | 7/1998 | Marron | ............................ 356/458 |
| 7,130,092 B1 | * | 10/2006 | Horimai | ............................ 359/35 |
| 2005/0141388 A1 | | 6/2005 | Yamatsu | |

FOREIGN PATENT DOCUMENTS

| | | |
|---|---|---|
| EP | 1306732 | 5/2003 |
| EP | 1542097 | 6/2005 |
| EP | 1624451 | 2/2006 |
| EP | 1843223 | 10/2007 |
| JP | 2002834310 | 3/2002 |
| WO | WO2006/003077 | 1/2006 |
| WO | WO2006080061 | 8/2006 |

OTHER PUBLICATIONS

Yasuda S. et al. : Optical Noise Reduction by Reconstructing Positive and Negative Images From Fourier Holograms in Coaxial Holographic Storage Systems' Optical Letters, OSA, Optical Society of America, Washington, DC, US vol. 31, No. 11, Jun. 1, 2006 pp. 1639-1641 XP001242561.
Crop Photopolymer Holographic Storage Media Achieves Archival Data Life Times At Areal Density of Greater Than 100 bits/um2, Holography 16.1, SPIE International Technical Group Newsletter, Jun. 2005.
Http://en.wikipedia.org/wiki/Interference_(wave_propagation); Interference (wave propagation), Wikipedia, the free encyclopedia, modified Jun. 10, 2009.
Yasuda et al., "Optical Noise Reduction by Reconstructing Positive and Negative Images from Fourier Holograms in Coaxial Holographic Storage Sytems", Optics Letters, vol. 31, No. 11, Jun. 1, 2006.
European Search Report for EP07301311 dated Nov. 25, 2010.

\* cited by examiner

*Primary Examiner* — Audrey Y Chang
(74) *Attorney, Agent, or Firm* — Tutunjian & Bitetto, P.C.

(57) ABSTRACT

The present invention relates to a holographic storage system, and more specifically to a method for pixel detection in a coaxial holographic storage system.

In a holographic storage system according to the invention, with a coaxial arrangement of an object beam and a reference beam the bright pixels within the object beam have a phase shift of essentially π relative to the reference beam. For read-out of a data page contained in a reconstructed object beam a detector detects an interference pattern generated by the interference between the reference beam and the reconstructed object beam.

3 Claims, 4 Drawing Sheets

HOLOGRAPHIC STORAGE SYSTEM USING DESTRUCTIVE INTERFERENCE FOR PIXEL DETECTION

This application claims the benefit, under 35 U.S.C. §119 of EP Patent Application 06119969.1, filed 1 Sep. 2006.

FIELD OF THE INVENTION

The present invention relates to a holographic storage system, and more specifically to a method for pixel detection in a coaxial holographic storage system.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a few layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array. A straightforward example of an SLM is an amplitude SLM, where the pixels with the value '0' block the light, and the pixels with the value '1' transmit or reflect it.

In a coaxial or collinear holographic storage system the reference and the object beam are arranged in a coaxial way. This has the advantage that both beams can use a single objective lens, which simplifies the optical setup. However, when the reference and the object beam both pass the objective lens on-axis during writing, during reading the reconstructed object beam is also on-axis with the reference beam. This makes it difficult to extract the information from the reconstructed object beam, since it is superimposed with the many times brighter reference beam. Therefore, a more or less difficult separation of the reconstructed object beam from the reference beam is necessary. This is usually realized by a spatial separation of the beams in the image plane, or with slightly tilted beams in combination with a blocking filter at an intermediate focus plane.

For example, in WO 2004/102542 a coaxial holographic storage system is described, wherein the object beam is spatially separated from the reference beam in the image plane. For this purpose the object beam is surrounded by a ring-shaped reference beam. This means, however, that only a part of the beam can be used for data storage.

SUMMARY OF THE INVENTION

It is an object of the invention to propose an alternative solution for the detection of data pages in holographic storage systems with coaxial object and reference beams.

According to the invention, this object is achieved by a holographic storage system with a coaxial arrangement of an object beam and a reference beam, in which the bright pixels within the object beam have a phase shift of essentially $\pi$ relative to the reference beam, and in which for readout of a data page contained in a reconstructed object beam a detector is provided for detecting an interference pattern generated by the interference between the reference beam and the reconstructed object beam.

Similarly, an apparatus for reading from a holographic storage medium, with a coaxial arrangement of a reference beam and a reconstructed object beam, has a detector for detecting an interference pattern generated by the interference between the reference beam and the reconstructed object beam for readout of a data page contained in the reconstructed object beam.

Furthermore, in an apparatus for writing to a holographic storage medium, with a coaxial arrangement of a reference beam and an object beam, the bright pixels within the object beam have a phase shift of essentially $\pi$ relative to the reference beam.

According to a further aspect of the invention, the above object is achieved by a method for holographic data storage with a coaxial arrangement of an object beam and a reference beam, having the steps of:
  generating an interference pattern by interference between the reference beam and a reconstructed object beam, and
  detecting the interference pattern for readout of a data page contained in the reconstructed object beam.

The invention proposes to arrange the reference beam and the object beam in such a way that they interfere destructively on the detector. This results in an at least partly cancellation of the reference beam at the pixel position. No separation of the beams is necessary, because the data can be extracted in form of an inverse pattern from the bright image of the reference beam. The method hence overcomes the difficulties of data detection in a coaxial setup. To achieve a destructive interference, the bright pixels within the reconstructed object beam preferably have a phase shift of essentially $\pi$ relative to the reference beam. This phase shift is advantageously generated during recording of a data page by setting the relative path lengths of the object beam and the reference beam, or by a phase shifting or switching element.

According to a refinement of the invention the correct phase relation is monitored during writing by checking the image on the detector. If the relative phase shift is $\pi$, the object beam at least partly cancels the reference beam. This results in the inverse data page image on the detector. With other words, if the cancellation is visible during writing, it will be also visible during reading, because the reconstructed object beam has theoretically the same properties as the original object beam. In practice, beam quality decreasing effects may cause an incomplete cancellation. However, this incomplete cancellation is still sufficient for a reliable data detection. For adjusting the relative phase shift, advantageously the path length of either the object beam or the reference beam is made adjustable, e.g. by a piezo element or any other phase shift adjusting element.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
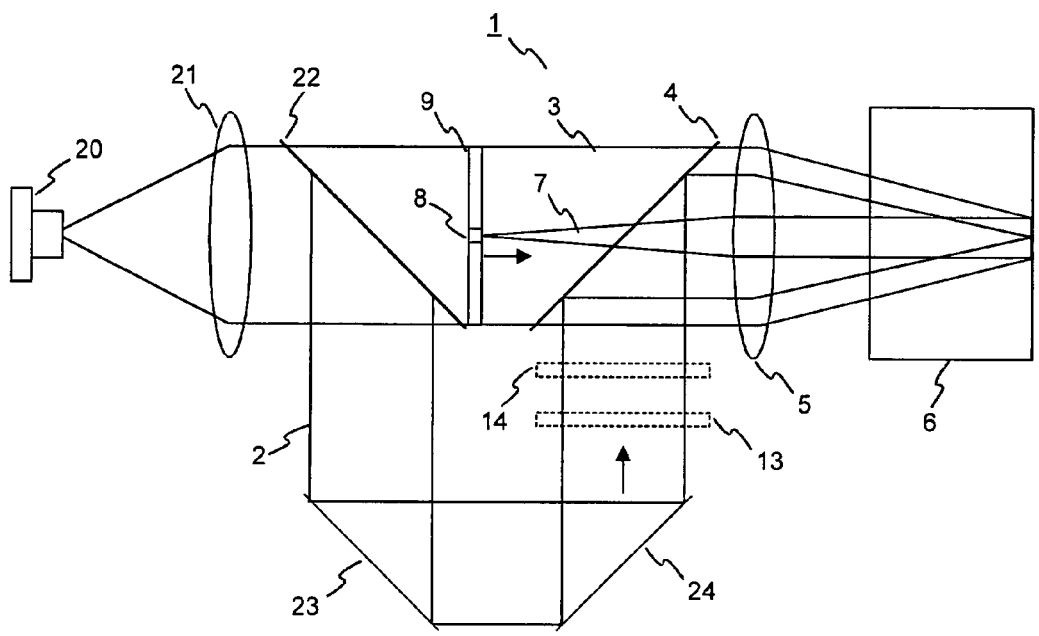
FIG. 1 schematically depicts the writing path of a coaxial holographic storage system, FIG. 2 schematically depicts the reading path of a coaxial holographic storage system.
Figure 2:
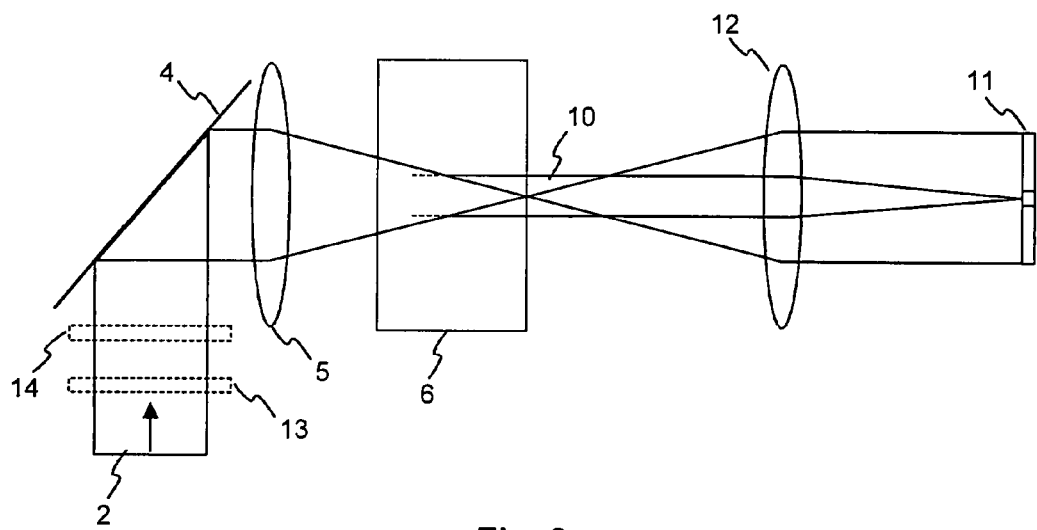

FIG. 1 shows a simplified configuration of a coaxial holographic storage system 1 according to the invention during writing. A reference beam 2 is superimposed on-axis to an object beam 3 by a beam splitter 4. The reference beam 2 and the object beam 3 are preferably generated by a single light source 20, e.g. with the help of a collimator lens 21, a beam splitter 22 and two steering mirrors 23, 24. Both beams 2, 3 pass a common objective lens 5 and are focused into or nearby a holographic storage medium 6. In the figure the light 7 coming from a single pixel 8 of a spatial light modulator 9 for writing a data page is highlighted. The wavefront coming from the pixel 8 has a phase shift of π with respect to the reference beam 2. In practice, a phase shift of exactly π is difficult to realize. It is, however, sufficient if the phase shift is close to π. In a coaxial setup, where the wavefronts of the object beam and the reference beam are exactly parallel, the phase shift is automatically the same for all pixels. The correct phase shift is obtained by adjusting the relative path lengths of object beam 3 and the reference beam 2, or by providing a phase shifting or switching element 13 in one of the beam paths. Examples for a phase shifting element 13 or a phase switching element 13 are a liquid crystal element or a switchable mirror, respectively. Of course, other methods for generating a phase shift may likewise be used. Advantageously, a phase shift adjusting element 14 is provided for actively adjusting the phase shift. The interference pattern resulting from the superposition of the object beam 3 and the reference beam 2 is stored in the holographic storage medium 6 as usual.

During reading the reference beam 2 is focused into or nearby the holographic storage medium 6 in the same way as during writing. In the figure, the holographic storage medium 6 is a transmission type storage medium. Of course, the invention is likewise applicable to a reflection type storage medium. The hologram stored in the holographic storage medium 6 diffracts the light in such way that the reconstructed object beam 10 has all the properties of the object beam 3, including the phase. Since the phase of the object beam 3 was adjusted to be shifted by π with respect to the reference beam 2, the phase shift of the reconstructed object beam 10 with respect to the reference beam 2 is also π. By destructive interference the reconstructed object beam 10 cancels at least partly the light of the reference beam 2. The image of the reference beam 2 on a detector 11 obtained by a further objective lens 12 shows a dark region at the position corresponding to the SLM pixel 8 that was switched on during writing.

The physical properties of the interference simplify the detection of the dark pixel in the image of the reference beam 2. The cancellation C of the light by destructive interference calculates to:

$$C = \frac{2 \cdot \sqrt{I_{ref} \cdot I_{obj}}}{I_{ref} + I_{obj}},$$

where $I_{obj}$ and $I_{ref}$ are the intensities of the reconstructed object beam 10 and the reference beam 2, respectively. Therefore, the weak light of the reconstructed object beam 10, which is determined by the diffraction efficiency of the hologram, is able to cancel a quite large amount of the reference beam 2. For example, a reconstructed object beam 10 with 6% of the intensity of the reference beam 2 cancels 47% of the light of the reference beam 2. A reconstructed object beam 10 of 1% cancels about 20%.

Figure 3:
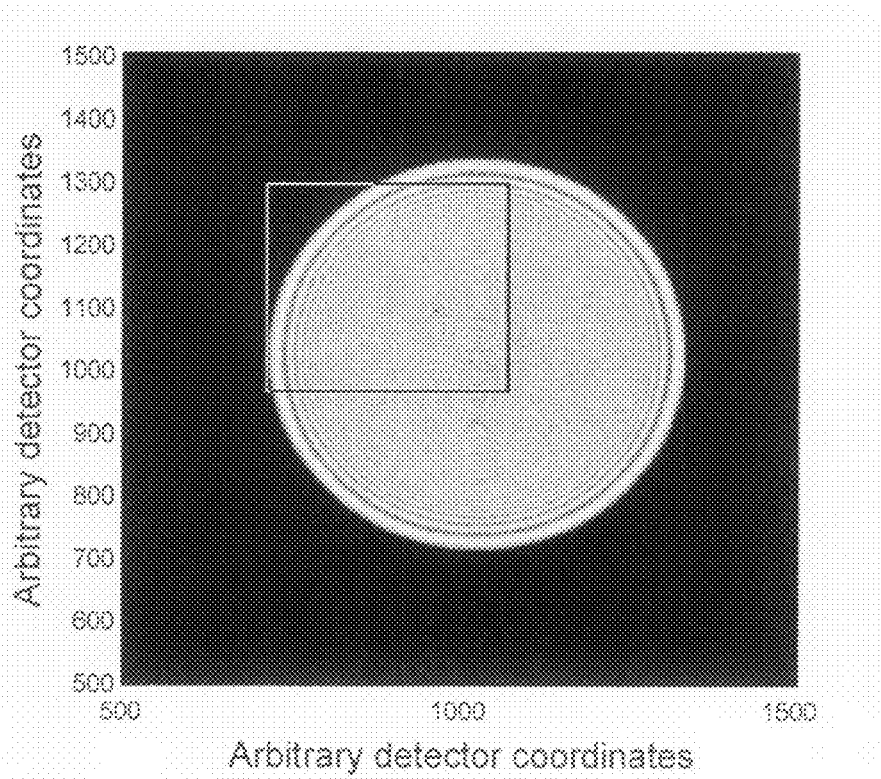
FIG. 3 shows the detector image of a reference beam interfering with a reconstructed object beam with a single pixel.
Figure 4:
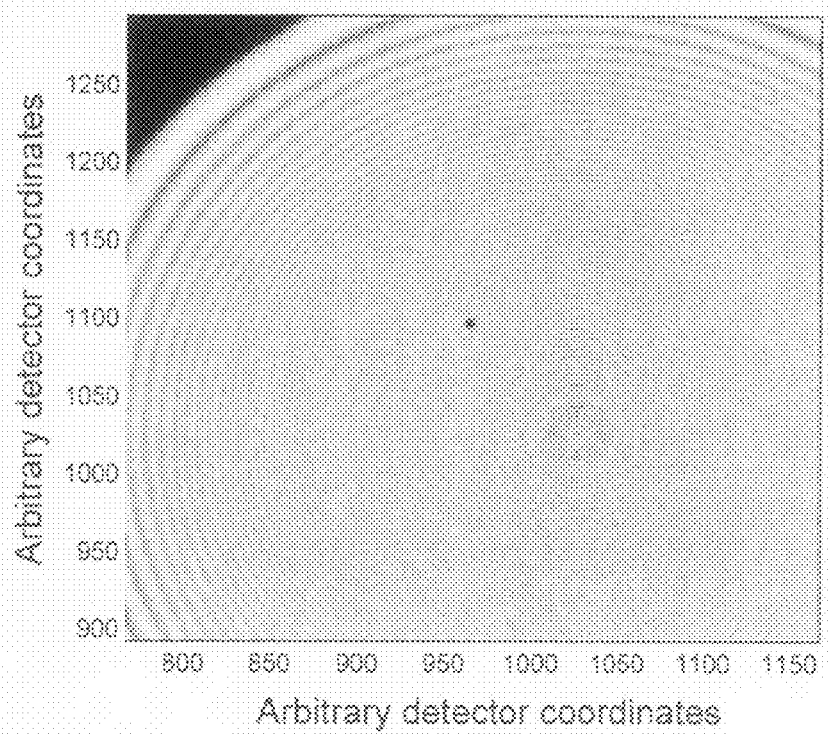
FIG. 4 shows an enlarged section of FIG. 3.
Figure 5:
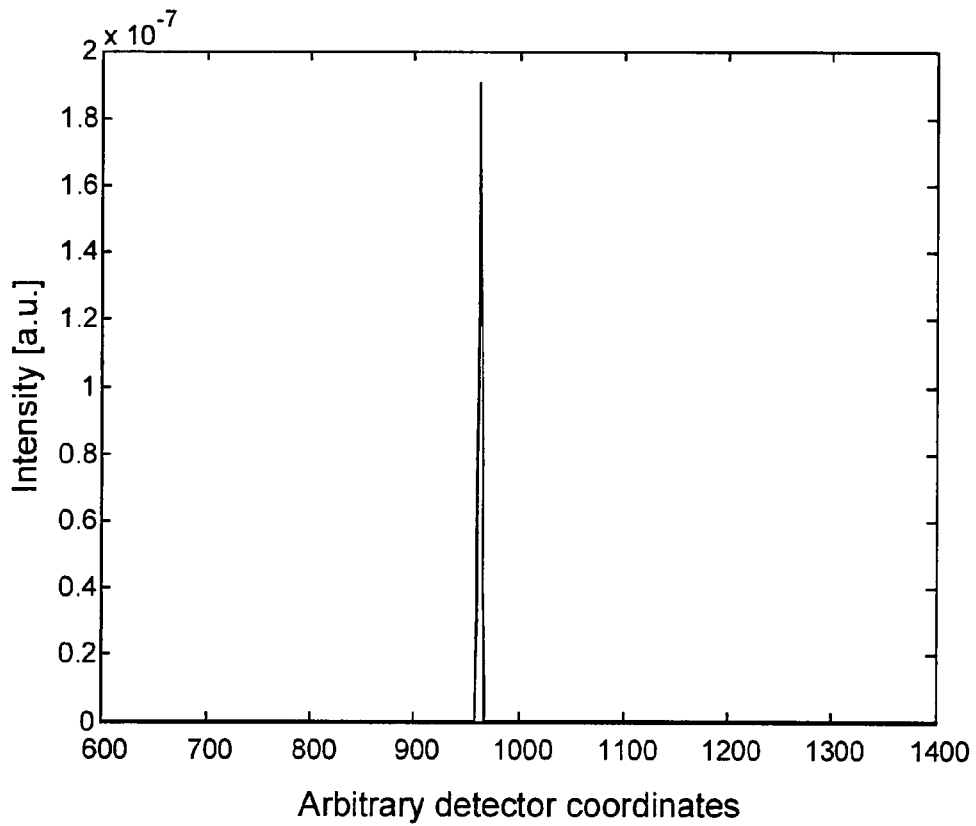
FIG. 5 shows a cut through the simulated intensity distribution of the reconstructed object beam.
Figure 6:
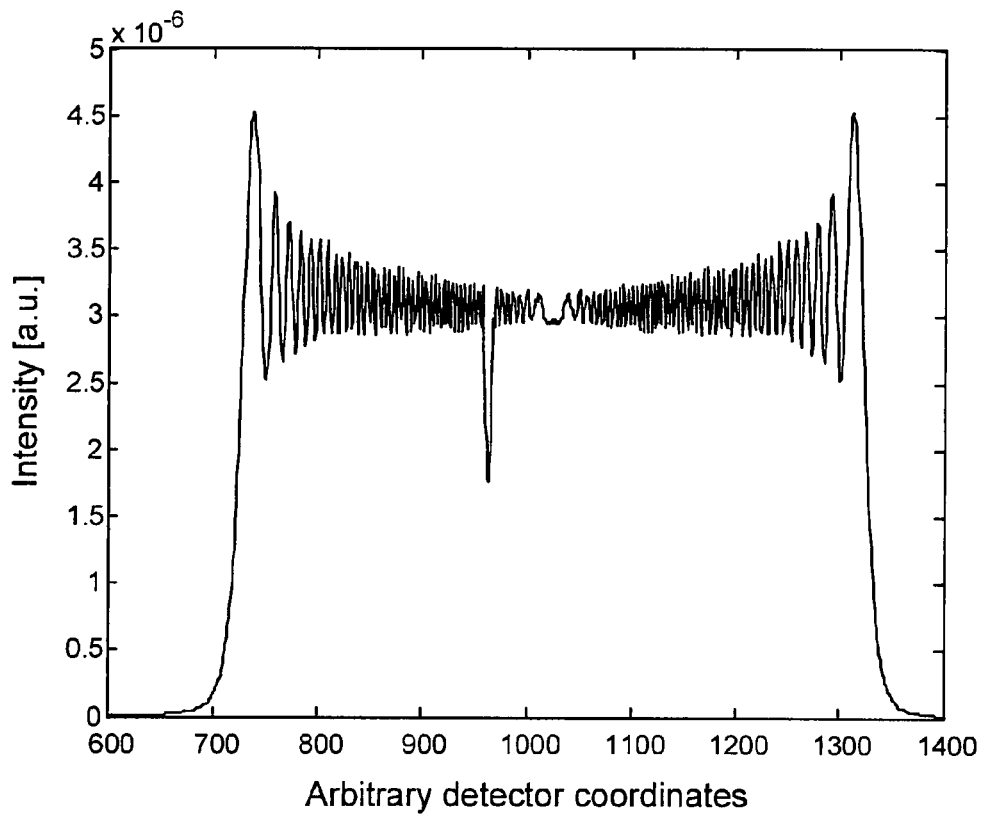
FIG. 6 shows a cut through the simulated intensity distribution of the detector image of the reference beam interfering with the reconstructed object beam.

To prove the method and especially the amount of light cancellation, the reading of the hologram with a single bright pixel was simulated numerically. The result is shown in FIGS. 3 to 6. The light of a relatively weak reconstructed object beam 10 with 6% of the intensity of the reference beam 2 partly cancels the light of the reference beam 2. FIG. 3 shows the image of the reference beam 2 on the detector 11. FIG. 4 shows an enlarged section of FIG. 3. The dark pixel resulting from the interference is clearly visible. The plot in FIG. 5 shows a cut through the simulated intensity distribution of the reconstructed object beam 10. The intensity and coordinates are given in arbitrary units. The peak height is I=1.9e−7. The plot in FIG. 6 shows a cut through the simulated intensity distribution of the image of the reference beam 2 superimposed by the reconstructed object beam 10 on the detector 11. Again, the intensity is given in arbitrary units. The height of the plateau is I=3.1e−6. As can be seen, the reconstructed object beam 10 with its intensity of 6% of the intensity of the reference beam 2 cancels about 47% of the reference beam 2 at the pixel position.

Figure 7:
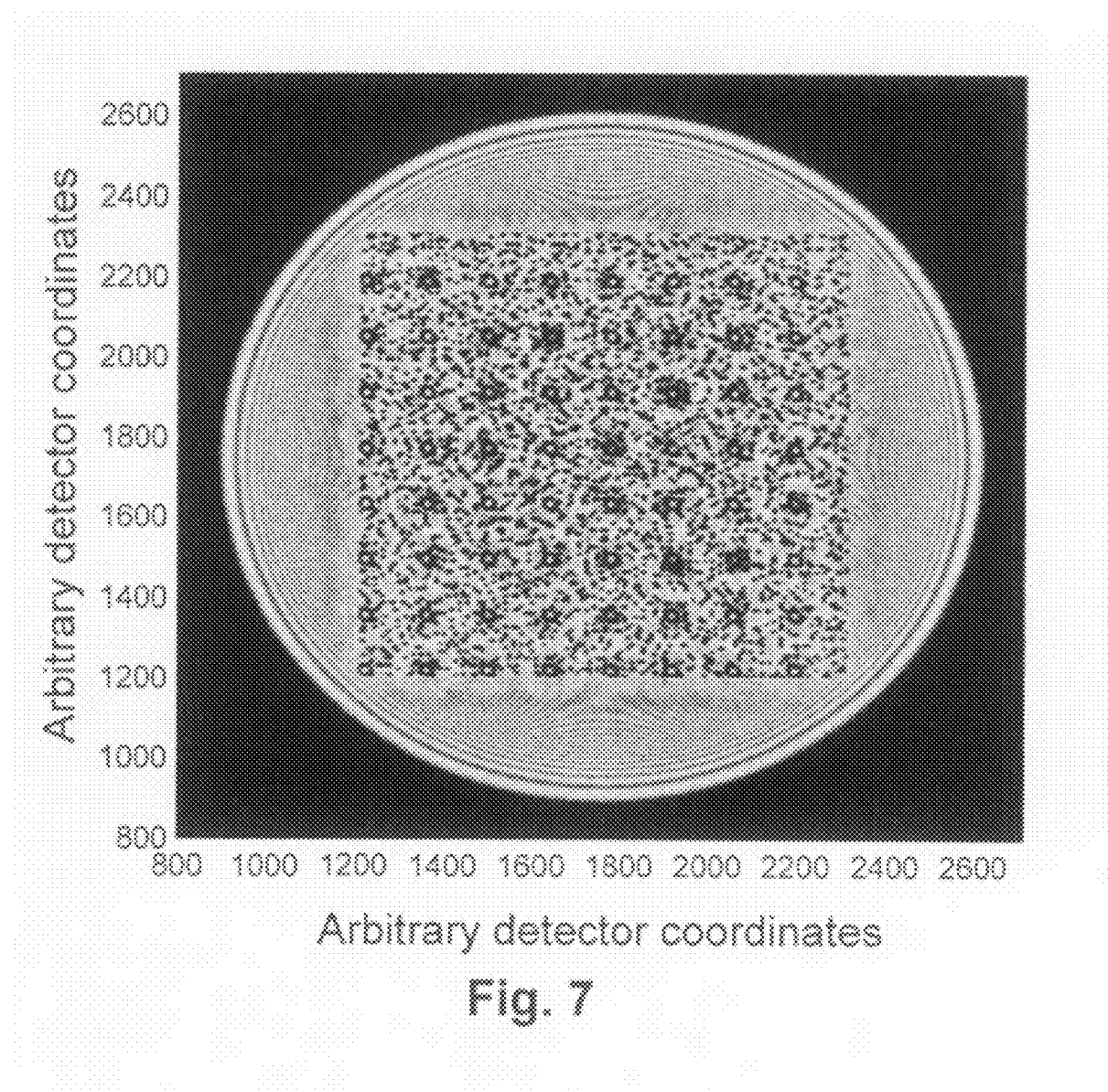
FIG. 7 illustrates a numerical simulation of the detector image of a full SLM data page written and read in accordance with the invention.

In FIG. 7 the numerical simulation of the detector image of a full SLM data page written and read as proposed by the invention is illustrated. The beam propagation technique was used for simulating the full process of writing and reading of the hologram. In the simulation, the complete setup described above was implemented. The wavelength of the object beam 3 and the reference beam 2 was λ=405 nm, the focal length and the numerical aperture of the objective lens 5 were $f_{objective}$=4.5 mm and NA=0.6, respectively. The data page was a typical datapage with 128×128 pixels and evenly distributed marks for synchronization. As can be seen, the method works well for a whole data page. All pixels switched on during writing partly cancel the reference beam during reading. Accordingly, the data page appears in form of an inverted image on the detector 11.

What is claimed is:

1. A holographic storage system, with a coaxial arrangement of a reference beam and an object beam containing a data page of bright and dark pixels, wherein the reference beam and the object beam are superimposed on-axis and the phase of the bright pixels within the object beam is shifted relative to the phase of the reference beam such that, when superimposed, a wavefront of the bright pixels has a phase shift of .essentially pi relative to a wavefront of the reference beam, wherein for readout of a data page contained in a reconstructed object beam, which is obtained by a partial diffraction of the reference beam at a hologram, the reconstructed object beam is superimposed on-axis with the reference beam, a wavefront of the bright pixels of the reconstructed object beam having a phase shift of .essentially pi relative to a wavefront of the reference beam, and wherein a detector is provided for detecting an interference pattern generated by an interference between the reference beam and the reconstructed object beam.

2. An apparatus for reading from a holographic storage medium, with a coaxial arrangement of a reference beam and a reconstructed object beam containing a data page of bright and dark pixels, the reconstructed object beam being obtained by a partial diffraction of the reference beam at a hologram, wherein the reference beam and the reconstructed object beam are superimposed on-axis, a wavefront of the bright pixels of the reconstructed object beam having a phase shift of .essentially pi relative to a wavefront of the reference beam, and wherein the apparatus comprises a detector for detecting an interference pattern generated by an interference between the reference beam and the reconstructed object beam at a position of the detector for readout of the data page contained in the reconstructed object beam.

3. A method for reading from a holographic storage medium with a coaxial arrangement of a reconstructed object beam containing a data page of bright and dark pixels and a reference beam, wherein the method comprises the steps of:
   generating the reconstructed object beam by a partial diffraction of the reference beam at a hologram,
   superimposing the reference beam and the reconstructed object beam on-axis, a wavefront of the bright pixels of the reconstructed object beam having a phase shift of .essentially pi relative to a wavefront of the reference beam,
   generating an interference pattern by interference between the reference beam and the reconstructed object beam at a position of a detector, and
   detecting the interference pattern with the detector for readout of the data page contained in the reconstructed object beam.

* * * * *